US 6,562,928 B1

(12) United States Patent
Plochocka

(10) Patent No.: US 6,562,928 B1
(45) Date of Patent: May 13, 2003

(54) TERPOLYMER OF MALEIC ACID, MALEIC ANHYDRIDE AND ALKYLVINYLETHER

(75) Inventor: Krystyna Plochocka, Scotch Plains, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/175,093

(22) Filed: Jun. 19, 2002

(51) Int. Cl.⁷ .............................................. C08F 116/12
(52) U.S. Cl. .................... 526/332; 526/271; 526/318.2; 525/244; 525/259
(58) Field of Search .............................. 526/271, 318.2, 526/332; 525/244, 259

(56) References Cited

U.S. PATENT DOCUMENTS

| | | | | |
|---|---|---|---|---|
| 4,506,041 A | * | 3/1985 | Tanigawa et al. | 523/139 |
| 5,264,510 A | * | 11/1993 | Swift et al. | 526/271 |
| 5,405,818 A | * | 4/1995 | De Thomas et al. | 502/151 |
| 5,869,695 A | * | 2/1999 | Ulmer et al. | 548/545 |

\* cited by examiner

*Primary Examiner*—Helen L. Pezzuto
*Assistant Examiner*—Amy P Perkins
(74) *Attorney, Agent, or Firm*—Walter Katz; William J. Davis; Marilyn J. Maue

(57) ABSTRACT

What is described herein is a terpolymer of maleic acid (MAA)/maleic anhydride (MAN)/alkylvinylether (AVE), made by partial cyclization, e.g. 1–99%, of a maleic acid/alkylvinylether copolymer, preferably comprising, in mole %, 1–49% MAA/1–49% MAN/50% AVE, and derivatized terpolymers thereof.

12 Claims, No Drawings

TERPOLYMER OF MALEIC ACID, MALEIC ANHYDRIDE AND ALKYLVINYLETHER

BACKGROUND OF THE INVENTION

1. Field of the Invention

This invention relates to maleic anhydride polymers, and, more particularly, to new and improved terpolymers of maleic acid, maleic anhydride and an alkylvinylether.

2. Description of the Prior Art

Maleic anhydride polymers, and copolymers with alkylvinylethers are well known in the art. However, terpolymers of maleic anhydride, maleic acid and alkylvinylethers are difficult to make, particularly terpolymers, which are suitable for use in personal care products.

Accordingly, it is an object of this invention to provide new and improved terpolymers of maleic anhydride, maleic acid and alkylvinylethers.

SUMMARY OF THE INVENTION

What is described herein is a terpolymer of maleic acid (MAA)/maleic anhydride (MAN)/alkylvinylether (AVE), e.g. methylvinylether, preferably solvent-free, and preferably having a composition, in mole %, of MAA 1–49%, MAN 1–49% and AVE 50%; made by partial cyclization, e.g. 1–99%, of a maleic acid/alkylvinylether copolymer; suitably, by heating at 50–150° C. preferably at 60–135° C., for a predetermined period of time, and under suitable reaction conditions.

Subsequent reaction of the terpolymer with alcohols/amines forms ester/amides, e.g. the menthol half-ester of the terpolymer.

The terpolymer also may be derivatized to form amides and imides, as described by Ulmer, H., in U.S. Pat. Nos. 5,869,695; 5,886,194; 5,959,122; 5,994,385; 6,025,501; described derivatized polymers of maleic anhydride, including esters/amides/imides.

The terpolymer in powder form may be used as a bioadhesive having a defined hydrophilic/hydrophobic ratio, preferably including a stabilizer to increase its molecular weight. The terpolymer also is suitable in oral care, pharma and personal care compositions, which are advantageously solvent free.

DETAILED DESCRIPTION OF THE INVENTION

The terpolymer of the invention is made by partial (1–99%) cyclization of maleic acid/alkylvinylether copolymer, as follows:

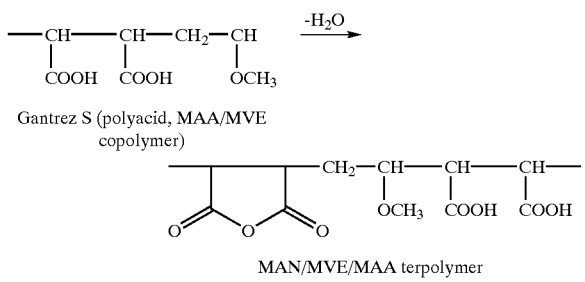

EXAMPLE 1

Gantrez® S-97 BF powder (having the formula above) (solvent free) was placed in 3–16 oz wide mouth jars (25.0 g of powder in each jar). The open jars then were placed in a vacuum oven at 135° C. and the jars were removed periodically from the oven. The resulting material was a crumbling, yellowish, coarse powder and solvent free. The reaction was followed by determining the % anhydride formed, e.g. by reaction with aniline and titration of excess of aniline with HCl aq. The results are given in Table 1 below:

TABLE 1

| Time, (hrs) | % Cyclization | Terpolymer (Mole %) | | |
| --- | --- | --- | --- | --- |
| | | MAA | MAN | MVE |
| 0 | 0.0 | 50 | 0 | 50 |
| 8 | 69.1 | 15.5 | 34.5 | 50 |
| 16 | 79.9 | 10.1 | 39.9 | 50 |
| 24 | 84.0 | 8.0 | 42.0 | 50 |

A change in the FT-IR spectrum of the product, i.e. a decrease in —COOH (MAA) absorbance (1730 cm$^{-1}$), and an increase in anhydride (MAN) absorbance (1860 cm$^{-1}$ and 1780 cm$^{-1}$) confirmed the extent of the cyclization reaction. Based on this FT-IR and % anhydride analysis, cyclization of maleic acid (MAA)/methylvinylether (MVE) copolymer generated solvent free maleic anhydride (MAN)/maleic acid (MM)/methylvinylether (MVE) terpolymer in the relative mole % given above.

EXAMPLE 2

Gantrez® S-97 BF (200 g) powder was charged into a 1-liter Buchi reactor. The powder was agitated while the reactor was heated to 105° C. and nitrogen was introduced from its dip tube. After 4 hours, the reactor was discharged. The product obtained was a yellowish, crumbling coarse powder. The terpolymer obtained had 15.1% wt. anhydride.

EXAMPLE 3

Gantrez® S-97 (16.78% solids in water) (300 g) was poured onto plastic trays in a thin layer (~0.25"). The trays were placed in a forced air oven at 65° C. Once the material became glassy and brittle, it was ground and placed in the oven at 65° C. for 24 hrs, followed by 85° C. for 48 hrs. The resulting material was a fine, white powder having the compositions given in Table 2.

TABLE 2

| Time, (hrs)/ Temperature, (° C.) | % Cyclization | Terpolymer (mole %) | | |
| --- | --- | --- | --- | --- |
| | | MAA | MAN | MVE |
| 24/65 | 4.16 | 47.9 | 2.1 | 50 |
| 24/65 + 24/85 | 12.9 | 43.5 | 6.5 | 50 |
| 24/65 + 48/85 | 18.8 | 40.6 | 9.4 | 50 |

While the invention has been described with particular reference to certain embodiments thereof, it will be understood that changes and modifications may be made which are within the skill of the art.

Accordingly, it is intended to be bound only by the following claims, in which:

1. A solvent free terpolymer of maleic acid (MAA)/maleic anhydride (MAN)/alkylvinyl ether (AVE).

2. A solvent free terpolymer according to claim 1 having the composition in mole %, MAA 1–49%, MAN 1–49% and AVE 50%.

3. A solvent free terpolymer according to claim 1 which is made by partial cyclization of a maleic acid/alkylvinylether copolymer.

4. A solvent free terpolymer according to claim 3 which is made by 1–99% cyclization of maleic acid to anhydride.

5. A solvent free terpolymer according to claim 3 which is made by heating the copolymer at 50–150° C.

6. A solvent free terpolymer according to claim 5 wherein said temperature is 60–135° C.

7. A solvent free terpolymer product which is made by reacting the terpolymer of claim 1 with alcohols/amines, to form ester/amides.

8. A solvent free terpolymer product according to claim 7 which is a menthol half-ester.

9. A derivatized solvent free terpolymer of claim 1 which is an ester/amide/imide.

10. A bioadhesive composition including the solvent free terpolymer of claim 1 having a predetermined hydrophilic/hydrophobic ratio.

11. A bioadhesive composition according to claim 10 including a stabilizer to increase its molecular weight.

12. An oral care, pharma or personal care product including the terpolymer of claim 1.

* * * * *